(12) United States Patent
Cerreta

(10) Patent No.: US 9,885,407 B2
(45) Date of Patent: Feb. 6, 2018

(54) DAMPER ASSEMBLY INCLUDING COVER PLATES FIXED TOGETHER BETWEEN SPRINGS

(71) Applicant: Schaeffler Technologies AG & Co. KG, Herzogenaurach (DE)

(72) Inventor: Joshua David Cerreta, Lakewood, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 43 days.

(21) Appl. No.: 15/004,766

(22) Filed: Jan. 22, 2016

(65) Prior Publication Data

US 2017/0211631 A1 Jul. 27, 2017

(51) Int. Cl.
| | |
|---|---|
| *F16H 45/02* | (2006.01) |
| *F16D 3/12* | (2006.01) |
| *F16F 15/134* | (2006.01) |
| *F16F 15/14* | (2006.01) |
| *F16F 15/131* | (2006.01) |

(52) U.S. Cl.
CPC ............. *F16H 45/02* (2013.01); *F16D 3/12* (2013.01); *F16F 15/13142* (2013.01); *F16F 15/13469* (2013.01); *F16F 15/145* (2013.01); *F16D 2250/0084* (2013.01); *F16H 2045/0205* (2013.01); *F16H 2045/0221* (2013.01); *F16H 2045/0226* (2013.01); *F16H 2045/0263* (2013.01)

(58) Field of Classification Search
CPC ............. F16H 45/02; F16H 2045/0205; F16H 2045/0221; F16H 2045/0226; F16H 2045/0231; F16H 2045/0263; F16H 2045/0278; F16D 3/12; F16D 2250/0084; F16F 15/134–15/13492
See application file for complete search history.

(56) References Cited

U.S. PATENT DOCUMENTS

| | | | | |
|---|---|---|---|---|
| 2011/0240429 A1* | 10/2011 | Heuler et al. | ......... | F16F 15/145 192/3.28 |
| 2015/0114781 A1 | 4/2015 | Zaugg | | |
| 2015/0369332 A1* | 12/2015 | Wickel et al. | ............ | F16D 3/12 464/68.8 |
| 2016/0123402 A1* | 5/2016 | Avins | .................. | F16F 15/1232 60/338 |

* cited by examiner

*Primary Examiner* — Richard Lorence
(74) *Attorney, Agent, or Firm* — Davidson, Davidson & Kappel, LLC

(57) ABSTRACT

A damper assembly for a torque converter is provided. The damper assembly includes a first cover plate including a spring retainer at a radial outer end of the first cover plate supporting springs; and a second cover plate including, at a radial outer end thereof, tabs for the springs, the tabs being in circumferential spaces between the springs The spring retainer and the tabs are fixed together inside the spring retainer. A method of forming a damper assembly is also provided. The method includes fixing a spring retainer at a radial outer end of a first cover plate to tabs at a radially outer end of a second cover plate inside the spring retainer. The tabs are in circumferential spaces between springs retained by the spring retainer.

16 Claims, 2 Drawing Sheets

DAMPER ASSEMBLY INCLUDING COVER PLATES FIXED TOGETHER BETWEEN SPRINGS

The present disclosure relates generally to damper assemblies and more specifically to damper assemblies of torque converters.

BACKGROUND

U.S. Publication No. 2015/0114781 discloses cover plates riveted together a location radially between an inner set of springs and an outer set of springs.

SUMMARY OF THE INVENTION

A damper assembly for a torque converter is provided. The damper assembly includes a first cover plate including a spring retainer at a radial outer end of the first cover plate supporting springs; and a second cover plate including, at a radial outer end thereof, tabs for the springs, the tabs being in circumferential spaces between the springs The spring retainer and the tabs are fixed together inside the spring retainer.

A torque converter is also provided. The torque converter includes the damper assembly and a turbine connected to the first cover plate.

A method of forming a damper assembly is also provided. The method includes fixing a spring retainer at a radial outer end of a first cover plate to tabs at a radially outer end of a second cover plate inside the spring retainer. The tabs are in circumferential spaces between springs retained by the spring retainer.

BRIEF DESCRIPTION OF THE DRAWINGS

The present invention is described below by reference to the following drawings, in which.

DETAILED DESCRIPTION

The disclosure provides a method of fixing cover plates together in a circumferential gap between arc springs. One of the cover plates serves as a spring retainer and the other is a stop for both the arc spring and a damper flange, which may save radial space. Typical conventional designs include a sheet metal rivet disposed radially between the inner and outer dampers.

Figure 1:
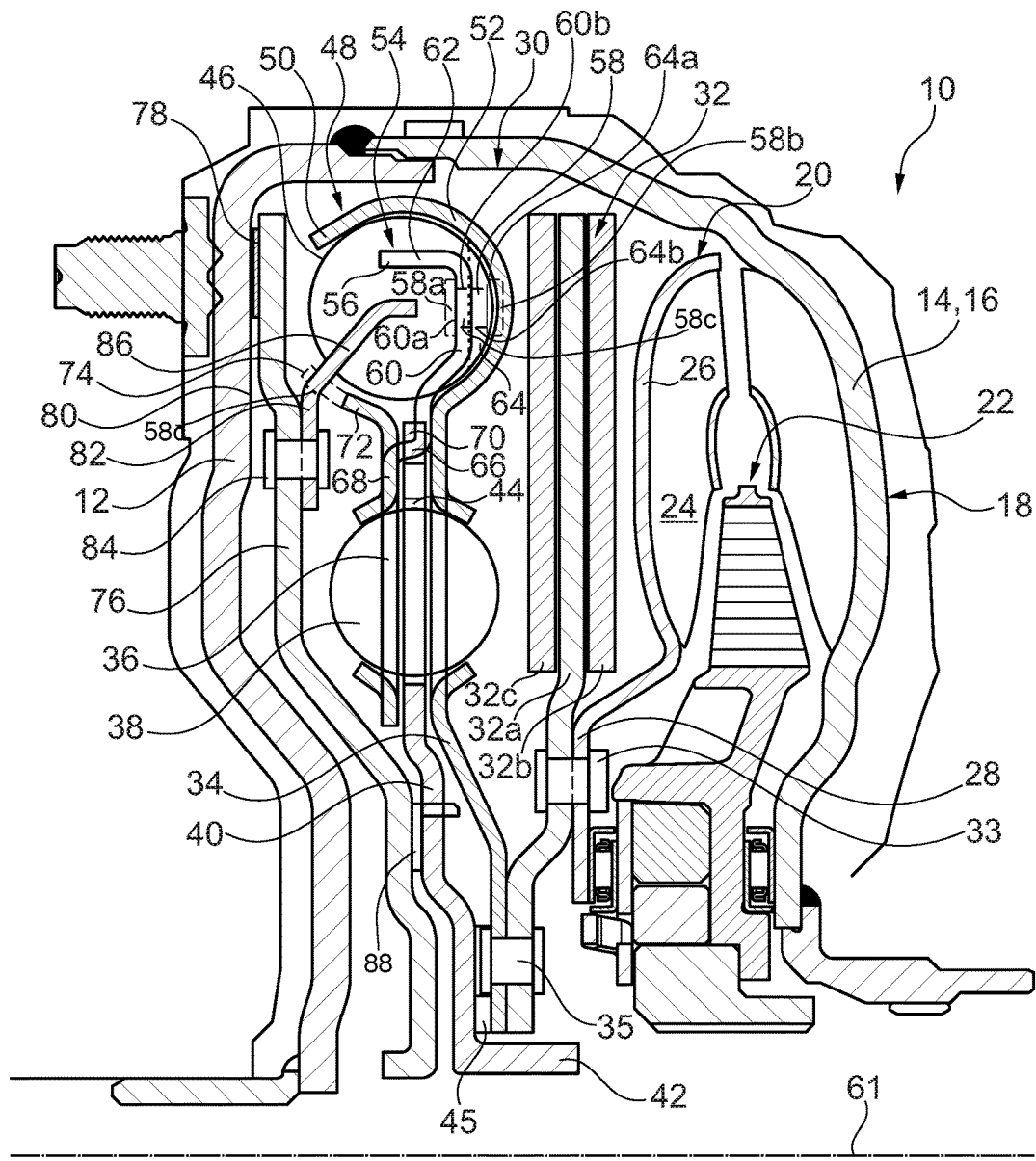
FIG. 1 schematically shows a cross-sectional side view of a torque converter in accordance with an embodiment of the present invention.

FIG. 1 shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes a turbine 20 opposite impeller 18 and a stator 22 axially between impeller 18 and turbine 20. Turbine 20 includes a plurality of blades 24 supported on a rounded portion 26 of turbine 20 at a rear-cover side of turbine 20. Turbine 20 further includes an inner radial extension 28 protruding radially inward from rounded portion 26. On a front-cover side of turbine 20, turbine 20 is connected to a damper assembly 30.

Damper assembly 30 includes a centrifugal pendulum vibration absorber 32. Centrifugal pendulum vibration absorber 32 includes a flange 32a, which is riveted at an inner radial end thereof to inner radial extension 28 of turbine 20 by a plurality of circumferentially spaced rivets 33, and two sets of masses—a set of masses 32b facing a rear cover side of torque converter 10 and a set of masses 32c facing a front cover side of torque converter 10—on opposite axial sides of flange 32a. Damper assembly 30, between centrifugal pendulum vibration absorber 32 and front cover 12 further includes a first cover plate 34 riveted to flange 32a of centrifugal pendulum vibration absorber 32 by a plurality of circumferentially spaced rivets 35, which are radially inside of rivets 33. Damper assembly 30 further includes a second cover plate 36 axially between first cover plate 34 and front cover 12, with cover plates 34, 36 supporting a plurality of circumferentially spaced radially inner set of arc springs 38 axially therebetween. Sandwiched axially between cover plates 34, 36, damper assembly 30 includes a drive flange 40 whose inner radial end 42 is configured for connecting to a transmission input shaft. Drive flange 40 includes a plurality of circumferentially extending slots 44 formed therein for receiving springs 38. Adjacent to rivets 35, first cover plate 34 is provided with a thrust washer 45 on an axial surface thereof for contacting an axial surface of drive flange 40 to prevent rivets 35 from contacting the axial surface of drive flange 40.

Radially outside of springs 38, damper assembly 30 further includes a plurality of circumferentially spaced radially outer set of arc springs 46. A radially outer end 48 of first cover plate 34 forms a spring retainer 50 for receiving springs 46. Spring retainer 50 includes a rounded portion 52 following a contour of approximately half of an outer circumference of springs 46. A radially outer end 54 of second cover plate 36 extends radially outward into circumferential spaces formed between springs 46 to form drive tabs 56 for springs 46. Tabs 56 are each configured for contacting axial ends of springs 46. To fix radially outer end 54 of cover plate 36 to radially outer end 48 of cover plate 34 inside spring retainer 50, circumferentially spaced connectors, in the form of rivets 58, fix tab 56 to rounded portion 52. More specifically, each tab 56 includes a radially extending section 60 attaching to the rivets 58 and an axially extending section 62 extending axially from a radial outer end of radially extending section 60. In this embodiment, radially extending section 60 extends perpendicular to a center axis 61 of torque converter 10 and axially extending section 62 extends parallel to center axis 61. Rivets 58 extend axially between radially extending sections 60 and radially extending sections 64 of spring retainer 50, which are formed circumferentially between circumferentially extending sections of rounded portion 52, to directly connect spring retainer 50 and tab 56. More specifically, each rivet 58 includes a first head 58a contacting a front cover side surface 60a of the respective radially extending section 60 and a second head 58b opposite first head 58a contacting a turbine side surface 64a of the respective radially extending section 64. Each rivet 58 also includes a shaft 58c connecting the respective first head 58a and second head 58b that extends through a respective hole 60b in radially extending section 60 and a respective hole 64b in each radially extending section 64.

Radially inside of tab 56 and contiguous therewith, second cover plate 36 includes first radially and axially extending sections 66 extending axially and radially away from a base portion 68, which supports inner springs 38, of cover plate 36 and toward first cover plate 34, more specifically toward radially extending portion 64 of spring retainer 50. Section 66, which in a similar manner as tabs 56 are formed by a plurality of circumferentially spaced sections, follows a path passing through slots formed circumferentially between radially extending tabs 70, which form overload stops for second cover plate 36 due to their interaction with section 66, on a radially outer end of drive flange 40. Also extending from a radial outer end of base portion 68, second cover plate 36 includes a second radially and axially extending section 72 extending radially in the same direction as section 66 and axially in the opposite direction as section 66. At a free end thereof, second radially and axially extending section 72 includes a plurality of circumferentially spaced overload stops 74.

A piston 76 is provided between front cover 12 and damper assembly 30. A thrust washer 88 is provided axially between drive flange 40 and piston 76 for contacting a damper side axial surface of piston 76 and a front cover side axial surface of drive flange 40. Piston 76, at a radially outer end thereof, is provided with a friction material 78 on a front cover side thereof for engaging an inner axial surface 80 of front cover 12. In another embodiment, friction material 78 may be provided on the inner axial surface 80 of front cover 12 instead of or in addition to on piston 76. Piston 76 and inner axial surface 80 form a lockup clutch for drivingly coupling turbine 20 to front cover 12 via damper assembly 30. Fluid pressure differences between a front cover side of piston 76 and a rear cover side of piston 76 control whether piston 76 is engaged with or is disengaged from front cover 12. Piston 76 is provided with a drive plate 82 riveted thereto by rivets 84. Drive plate 82 includes a plurality of circumferentially spaced tabs 86 for extending into the circumferential spaces formed between springs 46. Stops 74 of second radially and axially extending section 72 engage drive plate 82 in the circumferential spaces at an inner radial edge 86a of tabs 86. Springs 46 are each held tightly at one circumferential end by one of tabs 56 and at the other circumferential end by one of tabs 86. When damper assembly 48 winds up (i.e., tabs 56 and tabs 86 displace circumferentially relative to one another), tabs 86 eventually contacts stops 74 and tabs 56 eventually contact stops 70. Accordingly, tabs 86 and stops 74 have a certain circumferential clearance with respect to each other and tabs 56 and stops 70 have a certain circumferential clearance with respect to each other so springs 46 can compress before tabs 86 contact stops 74 and before tabs 56 contact stops 70, but the clearances are sized to prevent springs 46 from additional stress loads by bypassing springs 46 when torque exceeds the spring capacity.

Cover plates 34, 36 transfer torque from turbine 20, which is caused to rotated by fluid flow from the impeller 18, to drive flange 40, which in turn drives the transmission input shaft. Cover plates 34, 36 together transfer torque to springs 46, which transfer torque to piston 76 via drive plate 82. When the lockup clutch is engaged, front cover 12 and drive flange 40, and thus front cover 12 and the transmission input shaft, are coupled together via damper assembly 30 and the lockup clutch.

Figure 2B:
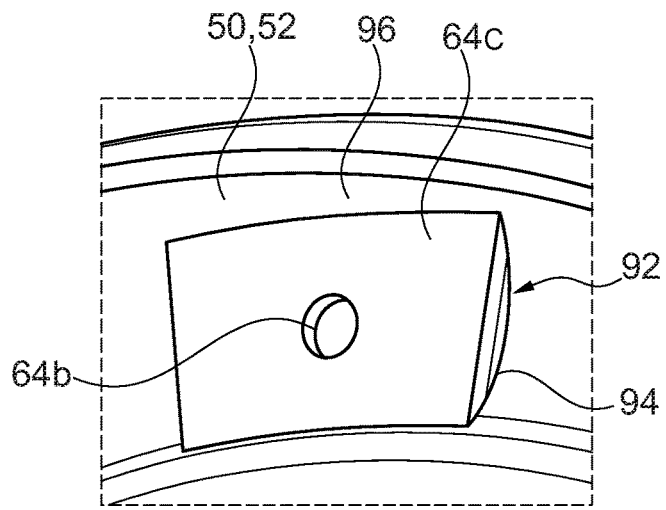
FIG. 2b shows a perspective view of one radially extending section of a spring retainer of the first cover plate.
Figure 2A:
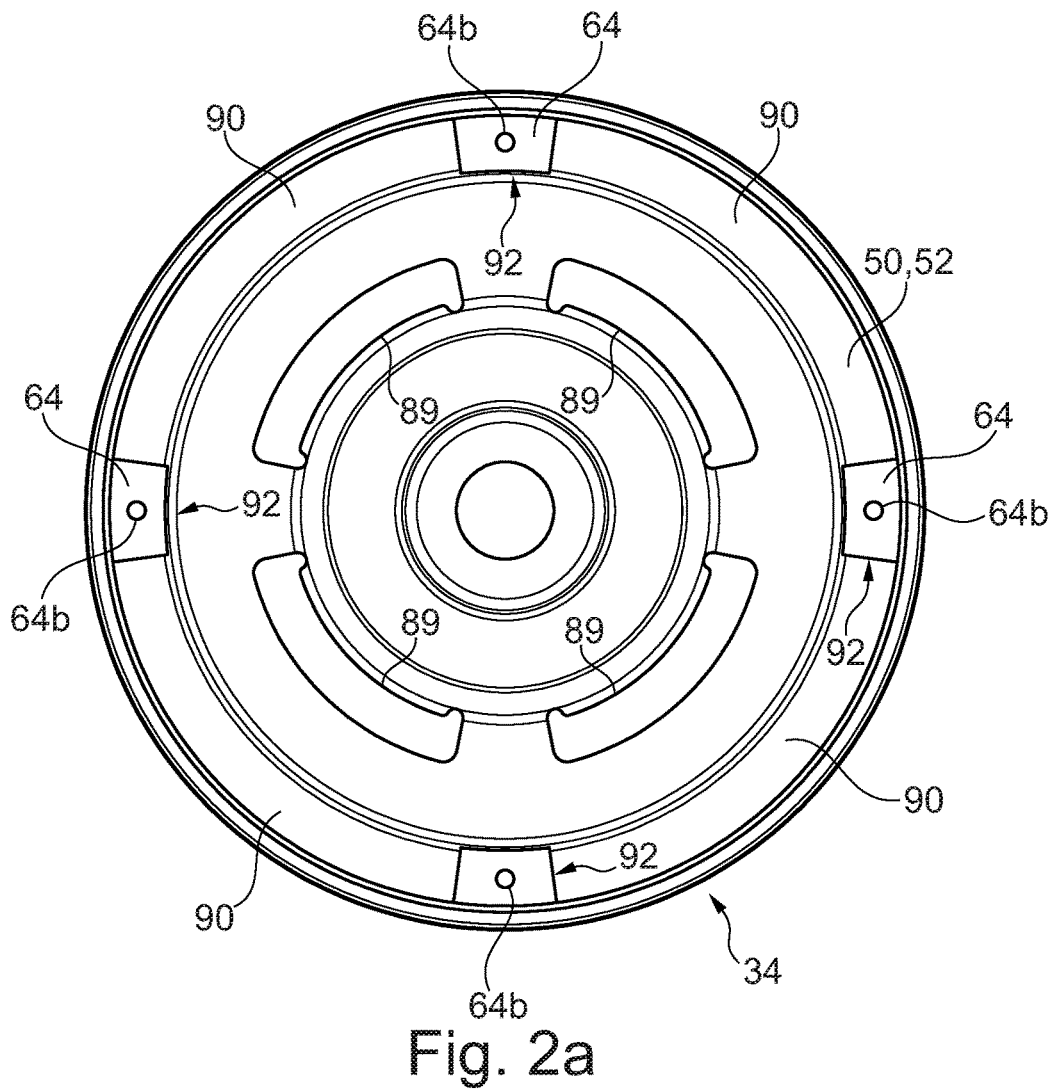
FIG. 2a schematically shows a plan view of a first cover plate of a damper assembly of the torque converter shown in FIG. 1.

FIG. 2a shows a plan view of first cover plate 34 and FIG. 2b shows a perspective view of one radially extending section 64 of spring retainer 50. Cover plate 34 includes circumferentially extending slots 89 for receiving springs 38 (FIG. 1) radially inside of spring retainer 50. As noted above, spring retainer 50 of cover plate 34 is provided with radially extending sections 64 for attachment circumferentially between circumferentially extending spring receiving sections 90 of rounded portion 52. More specifically, radially extending sections 64 are provided on inserts 92 that each include a rounded surface 94, which is opposite of a front cover side surface 64c. Rounded surface 94 is contoured to the shape of a rounded inner surface 96 of rounded portion 52 such that rounded surface 94 sits flush against rounded inner surface 96 when insert 92 is connected to spring retainer 50. Each insert 92 is provided with a rivet receiving hole 64b passing through radially extending section 64 and a similarly formed rivet receiving hole passing through rounded surface 94 for fixing insert 92 to spring retainer 50. During the fixing of cover plates 34, 36 together, inserts 92 are sandwiched axially between cover plates 34, 36 and support tab 56 (FIG. 1) in the proper position within spring retainer 50.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A damper assembly for a torque converter comprising:
   a first cover plate including a spring retainer at a radial outer end of the first cover plate for retaining springs; and
   a second cover plate including, at a radial outer end thereof, tabs configured for positioning in circumferential spaces between the springs, the spring retainer and the tabs being fixed together inside the spring retainer by connectors, the connectors being in the circumferential spaces between the springs.

2. The damper assembly as recited in claim 1 wherein the tabs are each configured for contacting one circumferential end of a corresponding one of the springs.

3. The damper assembly as recited in claim 1 wherein the connectors are rivets.

4. The damper assembly as recited in claim 1 wherein the tabs each include a radially extending section and the spring retainer includes a plurality of radially extending sections, each of the connectors connecting one of the radially extending sections of the tabs to one of the radially extending sections of the spring retainer.

5. The damper assembly as recited in claim 4 wherein the second cover plate includes, radially inside of the tabs and contiguous therewith, first radially and axially extending sections extending axially and radially away from a base portion of the second cover plate, the base portion of the cover plate supporting a radially inner set of springs, the radially inner set of springs being radially inside of the springs retained by the spring retainer.

6. The damper assembly as recited in claim 5 further comprising a drive flange configured for connecting to a transmission input shaft, the drive flange including tabs at a radially outer end thereof formed as overload stops for the first radially and axially extending sections.

7. The damper assembly as recited in claim 5 wherein the second cover plate further includes a second radially and axially extending section extending radially in the same direction as the first radially and axially extending section and axially in the opposite direction as the first radially and axially extending section, the second radially and axially extending section including a plurality of circumferentially spaced second plate overload stops at a free end thereof.

8. A torque converter comprising:
the damper assembly as recited in claim 1; and
a turbine connected to the first cover plate.

9. The torque converter as recited in claim 8 further comprising a centrifugal pendulum vibration absorber including a flange and masses on opposite axial sides of the flange, the flange connecting the first cover plate to the turbine.

10. The torque converter as recited in claim 8 further comprising a front cover and a piston forming a lockup clutch, the piston including a drive plate extending into the circumferential spaces between the springs.

11. The torque converter as recited in claim 10 wherein the second plate includes overload stops engaging the drive plate.

12. A method of forming a damper assembly comprising:
fixing a spring retainer at a radial outer end of a first cover plate to tabs at a radially outer end of a second cover plate inside the spring retainer, the tabs being in circumferential spaces between springs retained by the spring retainer, the fixing the spring retainer to the tabs includes providing a plurality of connectors fixing the spring retainer and the tabs together, the connectors being in the circumferential spaces between the springs.

13. The method as recited in claim 12 wherein the connectors are rivets.

14. The method as recited in claim 12 wherein the tabs each include a radially extending section and the spring retainer includes a plurality of radially extending sections, the fixing the spring retainer to the tabs including fixing each of the connectors to one of the radially extending sections of the tabs and one of the radially extending sections of the spring retainer.

15. A torque converter comprising:
a damper assembly comprising:
a first cover plate including a spring retainer at a radial outer end of the first cover plate for retaining springs; and
a second cover plate including, at a radial outer end thereof, tabs configured for positioning in circumferential spaces between the springs, the spring retainer and the tabs being fixed together inside the spring retainer;
a turbine connected to the first cover plate; and
a front cover and a piston forming a lockup clutch, the piston including a drive plate extending into the circumferential spaces between the springs.

16. The torque converter as recited in claim 15 wherein the second plate includes overload stops engaging the drive plate.

* * * * *